United States Patent [19]

Whitaker

[11] 3,999,813
[45] Dec. 28, 1976

[54] PRESSURE FLOW REGULATOR

[76] Inventor: William D. Whitaker, 1512 E. 5th St., Apt. 30, Ontario, Calif. 91764

[22] Filed: Sept. 30, 1975

[21] Appl. No.: 618,012

[52] U.S. Cl. .................................. 308/9; 137/487; 137/503
[51] Int. Cl.² ........................................ F16C 17/16
[58] Field of Search ................. 137/503, 487, 485; 308/9

[56] References Cited
UNITED STATES PATENTS

| 3,374,803 | 3/1968 | Leveque | 137/503 |
| 3,749,456 | 7/1973 | Whitaker | 308/9 |

*Primary Examiner*—Alan Cohan
*Attorney, Agent, or Firm*—Lyon & Lyon

[57] ABSTRACT

A regulator including a control piston contained within a housing and forming therewith opposed pressure chambers, the valve and housing having ported passages controlled by the piston for variable flow therethrough between a source of fluid and a fluid system, and other ported passages supplying fluid to the pressure chambers so as to effect movement of the piston to compensate for change in pressure or flow rate in the fluid system.

18 Claims, 15 Drawing Figures

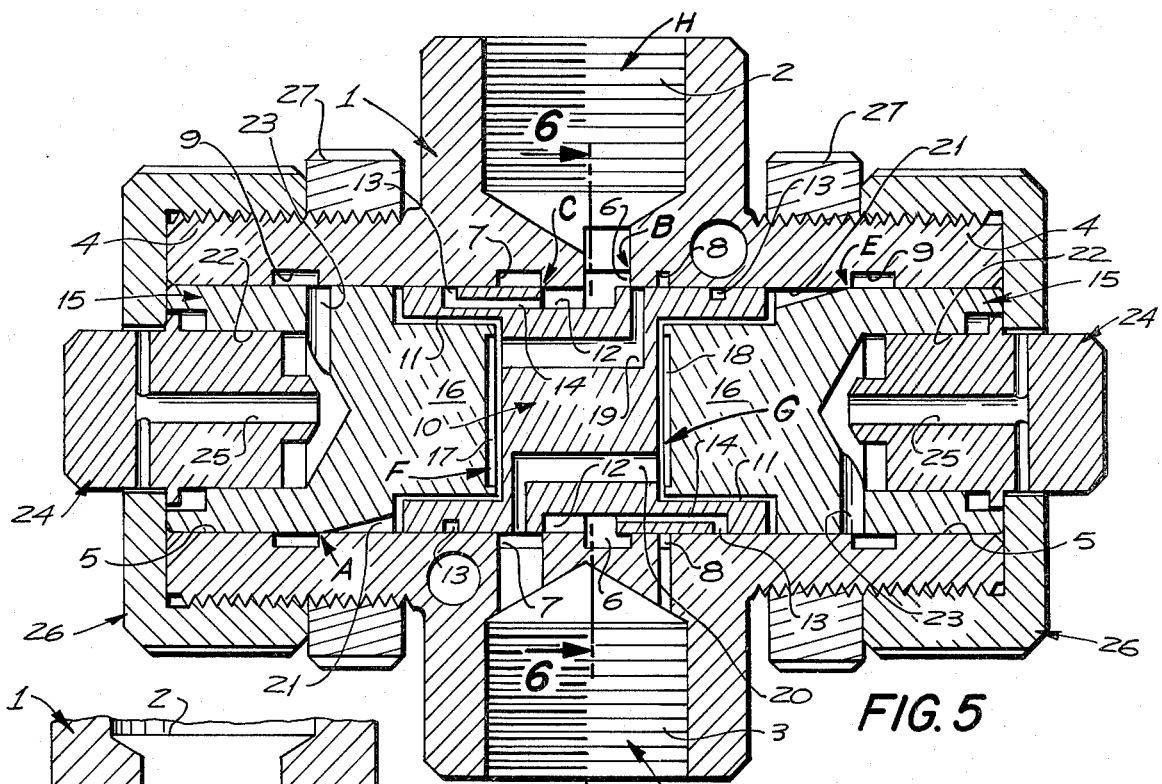
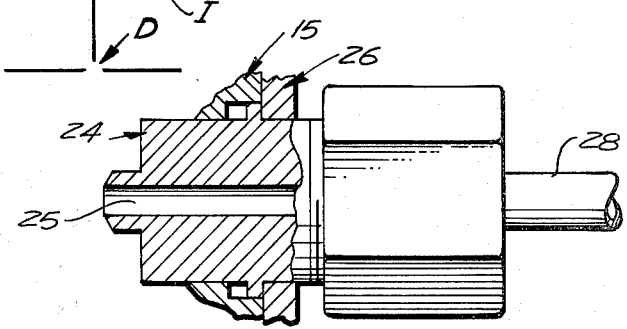
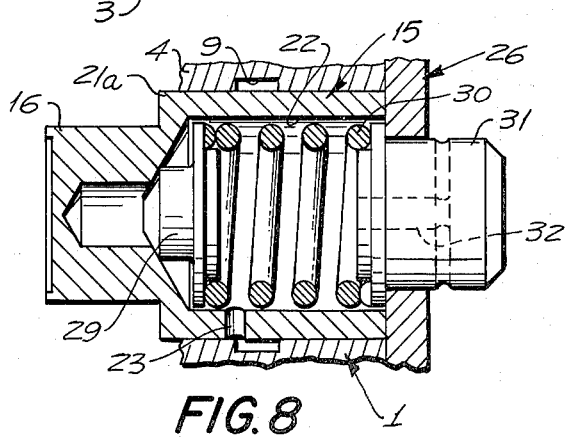
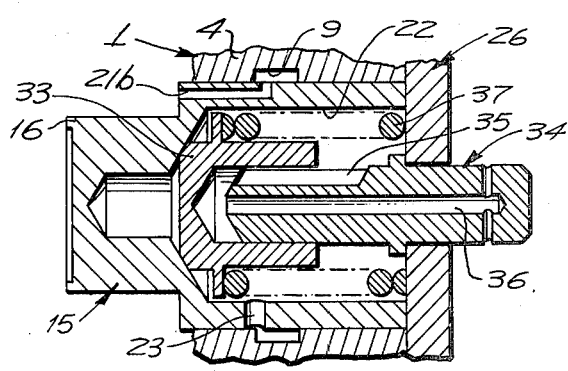
FIG. 5
FIG. 6
FIG. 7
FIG. 8
FIG. 9

PRESSURE FLOW REGULATOR

BACKGROUND OF THE INVENTION

The present invention is intended for uses similar to the uses of the regulators disclosed in Pat. No. 3,749,456 entitled: FLUID LUBRICATED BEARING AND PRESSURE SENSING CONTROL VALVE.

An essential feature of the previous and the present regulators is a rapid response to change in the fluid system under control, the present regulator having increased sensitivity.

SUMMARY OF THE INVENTION

The present invention is directed to a pressure flow regulator; that is a regulator which may be arranged to respond to pressure change or to flow rate change in fluid system, and is summarized in the following objects:

First, to provide a pressure flow regulator which may be adapted for use in a wide variety of fluid systems, including, but not limited to, fluid bearings either liquid or gas, fluid motors, and pilot valves.

Second, to provide a pressure flow regulator which may be arranged to have a predetermined gain or amplification of the change in pressure or flow rate in the fluid system, as well as a predetermined rate of response, such as an extremely high gain and response rate particularly suited for the control of air bearings under highly variable load and speed conditions or, by comparison, a relatively moderate gain and response if the requirements of the fluid system permit.

Third, to provide a pressure flow regulator, an embodiment of which utilizes a piston contained within a housing, the piston and housing forming opposed pressure chambers which controllably vent to atmosphere or lower pressure region, one chamber being fully exposed to downstream pressure, the other being variably exposed to upstream pressure in response to movement of the piston, the piston controlling flow passages from the upstream side to the low stream side to compensate for downstream pressure change.

Fourth, to provide a pressure flow regulator, another embodiment wherein a piston contained within a housing utilizes a novelty arranged fluid switch having a first inlet sensing pressure downstream of the regulator, a second inlet which varies with piston position in response to sensing pressure change downsteam of the regulator, the inlets producing fluid jets which engage an amplifying jet to effect faster piston movement.

Fifth, to provide a pressure flow regulator which may be arranged for ready manual adjustment or arranged for remote control.

DESCRIPTION OF THE FIGURES

FIG. 5 is an enlarged sectional view of the embodiment of the pressure-flow regulator shown in FIG. 1, the view being taken through 5—5 of FIG. 1, the view being rotated 90° from the position shown in FIG. 1.

FIG. 6 is a fragmentary transverse sectional view thereof taken through 6—6 of FIG. 5.

FIGS. 7, 8, and 9 are fragmentary sectional views of the pressure-flow regulator illustrating various types of controls which may be connected thereto, or inserted therein.

SPECIFICATION

Figure 1:
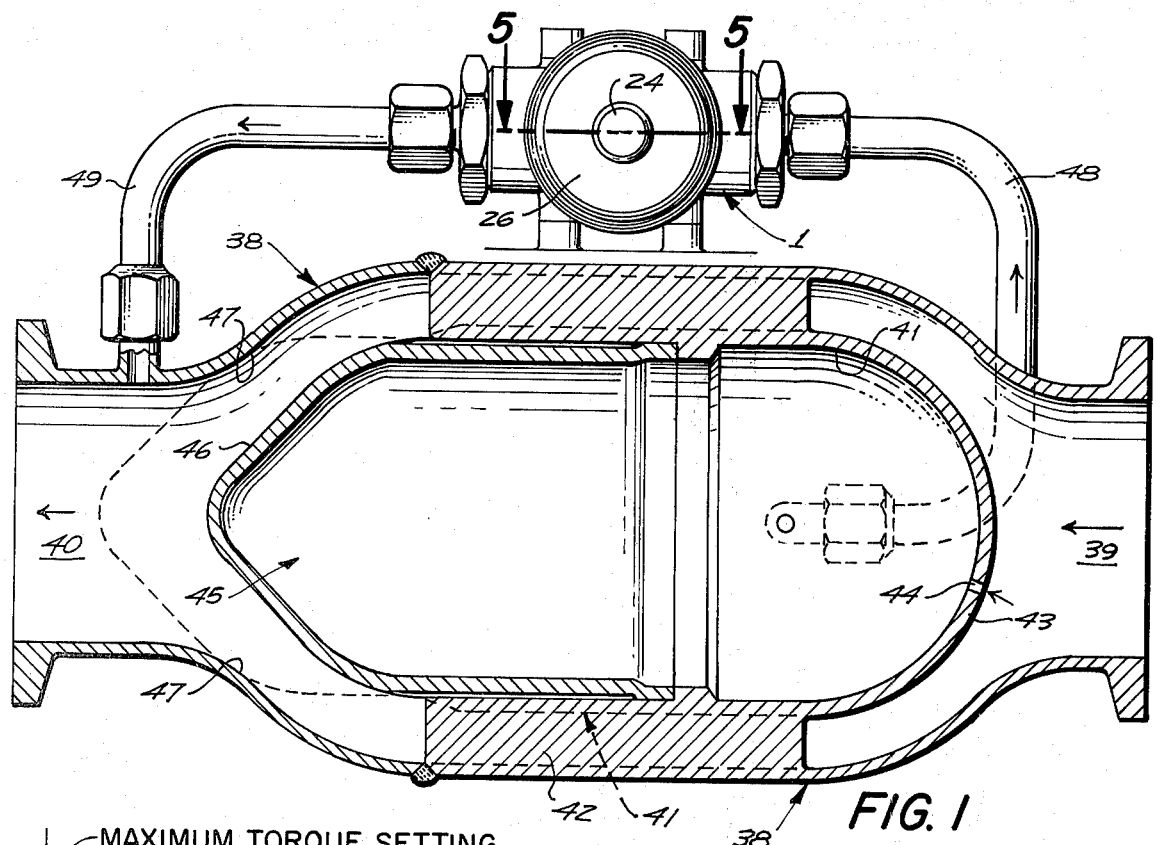
FIG. 1 is a side view of one embodiment of the pressure-flow regulator arranged for use as a pilot valve for a main valve, the main valve being shown in section.

Reference is first directed to FIG. 5. The embodiment here illustrated includes a housing 1 provided with an inlet 2 and outlet 3 which are internally screwthreaded and diametrically disposed. The housing is provided at right angles to the inlet and outlet with a pair of oppositely directed externally screwthreaded extensions 4. A cylindrical bore 5 is formed within the extensions 4 and traverses the inlet and outlet.

The bore 5 is provided with an annular inlet channel 6 communicating with the inlet 2 and an annular outlet channel 7 communicating with the outlet 3. The channels 6 and 7 are offset axially with respect to the bore 5. Axially offset from the inlet channel 6 is a small annular relief channel 8 communicating with the outlet 3. Near the extremities of the bore 5, there is provided within each extension 4, an annular bleed channel 9.

Slidably fitted within the bore 5 is a piston 10 which is preferably provided with end sockets 11 to reduce the mass of the piston 10. The piston 10 is provided with an annular flow control channel 12 which bridges between the inlet and outlet channels 6 and 7. Between the channel 12 and the extremities of the piston 10 there is provided lubricating channels 13 connected to the flow control channel 12 by passages 14.

The extremities of the bore 5 receive end plugs 15 having inner end portions 16 extending into the sockets 11 forming therewith an inlet pressure sensing chamber 17 and an outlet pressure sensing chamber 18. The piston is provided with an inlet pressure sensing passage 19 having a radial portion variably communicating with the inlet channel 6 and an axial portions extending to the pressure sensing chamber 17. A similar outlet pressure sensing passage 20 includes a radial portion in full communication with the outlet channel 7 and an axial portion extending to the outlet pressure sensing chamber 18.

The reduced inner end portions 16 of the end plugs 15 clear the side walls of the sockets 11 so that each sensing chamber includes the annular space between the corresponding end of the piston 10 and the confronting annular shoulder formed by the end portion 16. Each shoulder is intersected by one or more tapered bleed slots 21, the small ends of which communicate with the bleed channels 9. Each end plug is provided with a socket 22 connected by a radial passage 23 with the corresponding bleed channel 9. Each socket 22 receives a closure 24 having a passageway 25 communicating with the corresponding radial passage 23. Externally, each screwthreaded extension 4 is provided with a screw cap 26 which is perforated to receive the corresponding closure 24 and overlies the periphery of the corresponding end plug 15 so as to retain the end plug in place. Each closure 24 is provided with a flange which is engaged by the screw cap 26. Also screwthreaded on each extension 4, is a locking ring 27.

Operation of the pressure flow regulator is indicated as follows:

When the piston 10 is in a steady state position, the ratio between the various orifice area ratios are as follows:

$B/A = C/D$, if $E = O$ and $F = G$ in which:

A = the orifice area between the bleed channel 9 and bleed slot 21 at the left of FIG. 5.

B = the orifice area between the inlet channel 6 and the inlet pressure sensing passage 19.

C = the orifice area between the flow control channel 12 and the outlet channel 7.

D = the orifice area restriction downstream of the regulator.

E = the orifice area between the bleed channel 9 and the pressure in the outlet pressure sensing chamber 18, bleed slot 21 at the right side of FIG. 5.

F = the inlet reference pressure in the sensing chamber 17.

G = the outlet sensing pressure in the sensing chamber 18.

Also:

H = the inlet pressure in the inlet 2.

I = the outlet pressure in the outlet 3.

An increase in orifice area A decreases, the reference pressure F. An increase in the orifice area D decreases the orifice area B and the orifice area C. An increase in orifice area E decreases the regulator gain.

A change in pressures H, I, F or G will move the piston 10 to a new position from its steady state position, if E is greater than O.

Friction resistance to movement of the piston 10 is minimized by supporting the piston 10 on a fluid film supplied through the lubricating channels 13. The piston 10 clearances are dimensioned to pass particles that are too small to be stopped in a filter provided in the fluid supply. Viscus friction resistances to piston movement is reduced with the use of low viscosity fluid. The inertia resistance to movement of the piston 10 is decreased by reducing the mass of the piston. This is achieved by providing the end sockets 11, sound wave and shock wave pressure signals, which travel at the velocity of sound. In the fluid, are used to achieve faster movement of piston 10 without compressing the compressible fluids total volume to achieve increased pressure. This increases the piston response to change in the downstream flow resistance.

Referring to FIG. 7, the passageway 25 may extend axially through the closure plug 24 and be joined to a fluid pressure line 28. This provides for remote control of the pressure flow regulator, for fluid motors or as a pilot valve or the like.

Referring to FIG. 8, the socket 22 of either end plug 15 may receive a disk 29 which is engaged by a spring 30 the outer end of which engages a cap 31 retained by the screw cap 26 and provided with a bleed passage 32. An abrupt bleed slot 21a may be substituted for the sloping bleed slot 21. The spring 30 is shown as under a minimum compressed condition. Pressure against the end 16 of the plug 15 compresses the spring and causes the bleed slot 21a to overlap channel 9 progressively and limit pressure in the pressure sensing chamber 17 or 18 depending on which end of the regulator that the plug 15 is mounted. The embodiment shown in FIG. 8 is used to limit maximum torque in a fluid motor control.

Referring to FIG. 9, either or both sockets 22 of the end plug 15 may receive a plunger 33 having a socket which receives a pin 34 having an axial slot 35 and bleed passage 36. A spring 37 bears against the plunger 33 to exert a force on the end plug 15. A bleed passage 21b may be substituted for the sloping bleed slot 21. After predetermined compression, the bleed passage 36 is closed causing pressure in the corresponding pressure sensing chamber 17 or 18 to increase moving the piston 10 in the opposite direction. Usually the connection is with chamber 17 whereby closure of the vent 36 tends to cause movement of the piston 10 toward its closed position. The embodiment shown in FIG. 9 is used to close the pressure flow regulator piston when the preset maximum torque is achieved in the fluid motor control.

Referring to FIG. 1, the pressure flow regulator may be used as a pilot control for a main valve. The main valve includes a valve housing 38 having an inlet 39 and an outlet 40 in axial alignment. Contained within the housing is a cylinder 41 secured in place in centered relation with the housing by radial supporting webs 42. The downstream end of the cylinder 41 is closed by a domeshaped end 43 having a small control fluid bleed port 44.

The cylinder 41 receives a main valve 45 which may be hollow and is provided with a conical closed end 46. The housing is provided with a valve seat 47.

The pressure fluid regulator when used as a pilot control is maintained at one side of the housing and it's inlet 2 is connected to an inlet line 48 joined to the housing 38 upstream of the valve seat 47. The outlet 3 is connected by an outlet line 49 to the outlet 40.

When the pressure flow regulator is used as a pilot control, "preselected" pressure is maintained in the cylinder 41 calculated to maintain the main valve 45 in a desired position. A decrease in pressure within the cylinder 41, due to an increase in pressure downstream of the main valve, causes the regulator to open so as to produce a further increase in pressure. Conversely, an increase in pressure in the cylinder 41 has the opposite effect.

Referring to FIGS. 10 through 15, the pressure flow regulator which in FIGS. 5 through 9 may be utilized in as a fluid bearing control. The fluid bearing control is utilized in conjunction with a shaft 50 having a thrust plate 51. The shaft is received in the cylindrical bearing block 52 contained within a housing 53 and having a shaft receiving bore 54.

The bearing block 52 is provided with a set of axially extending controller bores 55 for a radial fluid bearing and a set of controller bores 56 for a thrust fluid bearing. The bores 55 and 56 are arranged in alternate relation in common circle. The bores 55 and 56 correspond to the bore 5 shown in FIG. 5, and have corresponding annular inlet channels 6, annular outlet channel 7 and annular relief channels 8. Each bore 55 or 56 receives a piston 57 which may be identical to the piston 10 shown in FIG. 5, but in any case, is similar in that it includes end sockets 11; an annular flow control channel 12; lubrication channels 13; and connecting passages 14 for the channels 13. End plugs 58 are substituted for the end plugs 15; however, the piston 57 and corresponding end plugs 58 form an inlet pressure sensing chamber 17 and an outlet pressure sensing chamber 18 corresponding to the construction shown in FIG. 5.

While the piston 5 may be used in the pressure bearing control, a faster response to changing conditions may be obtained by use of a fluidic control means 59 shown particularly in FIGS. 12, 13, 14 and 15. The control means includes an inlet pressure sensing passage 60 an outlet pressure sensing passage 61. The passages 60 and 61 are directed towards each other into opposite sides of a chamber 62 having divergent walls. A control jet passage 63 is directed radially in centered relation between the divergent walls of the chamber 62. The end of the chamber remote from the jet passage 63 and the inner sections of the inlet and outlet pressure sensing passages 60 and 61 forms an arcuate end wall 64 intersected by divergent discharge passages 65. Beyond the end wall 64, the passages 65 are joined by a cross passage 66. The extremities of the divergent passages 65 are connected to the inlet pressure sensing chamber 17 and outlet pressure sensing chamber 18 by connecting passages 67.

In order to form the passages of the fluidic control means 59, the central portion of the piston 57 containing these passages may be formed as a diametrically split cylinder pressed axially into the peripheral portion of the piston, the passages being formed between the complementary semi-cylindrical portions.

The inlet channels 6 of the bores 55 and 56 communicate with radially outwardly disposed inlet passages 68 with appropriate inlets 69 provided in the housing, which in turn are connected to the source of fluid pressure.

The outlet channels of the controller bores 55 which receive the set of pressure fluid regulators for the radial fluid bearing are joined to radial outlet passages 70 which communicate with arcuate fluid bearing chambers 71 confronting the shaft 50.

The annular outlet channel 7 of the controller bores 56 which receive the set of pressure fluid regulators for the thrust fluid bearing communicate with axially extending outlet bores 72, which communicate with arcuate fluid bearing chambers 73 formed in the side of the bearing block 52 confronting the thrust plate 51. It should be noted that the chambers 73 extend across the ends of the plugs 58 which confront the thrust plate 51.

The set of pressure fluid regulators which control the radial bearing function as follows:

If the shaft 50 displaces toward a chamber 71, pressure is increased causing an increased pressure signal to be transmitted through the corresponding passage 70 with the result that the piston 10 or 57 is moved in a direction to supply more pressure fluid. Conversely, if the shaft 50 displaces away from a chamber 71 a decreased pressure signal is transmitted with the result that the piston 10 or 57 is moved in a direction to supply less pressure fluid. As changes in bearing loads occur, fluid pressure in each radial fluid bearing chamber increases or decreases to maintain adequate fluid in each chamber as well as an adequate film between the shaft 50 and bearing housing 52.

The set of pressure fluid regulators which control the thrust bearing function similarly except movement of the thrust plate is the same for all the thrust bearing regulators causing these regulators to move in unison.

Operation of the pressure flow regulators shown in FIGS. 10 through 15 is essentially the same as described in reference to FIGS. 5 through 9. However, by provision of the fluidic control means 59, the response is much more rapid.

Figure 13:
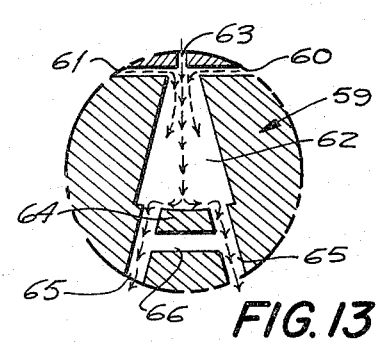
FIG. 13 is a fragmentary sectional view taken within circle 13 of FIG. 12 and showing a fluid switch in its neutral mode.

When the pressure in chambers 17 and 18 are in balance ($F = G$) the fluid flow is essentially as shown in FIG. 13; that is, fluid entering through the control jet passage 63 and through inlet and outlet pressure sensing passages 60 and 61 are in balance so that the fluid is equally distributed in the discharge passages 65.

Figure 14:
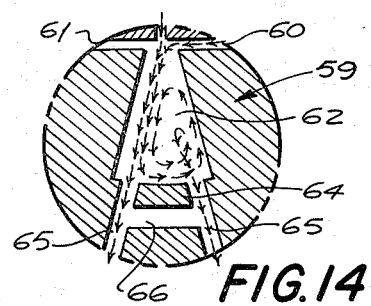
FIGS. 14 and 15 are views similar to FIG. 13 in showing other operating modes of the fluid switch.
Figure 15:
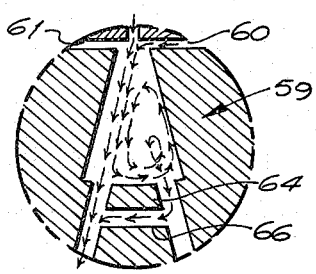
Figure 11:
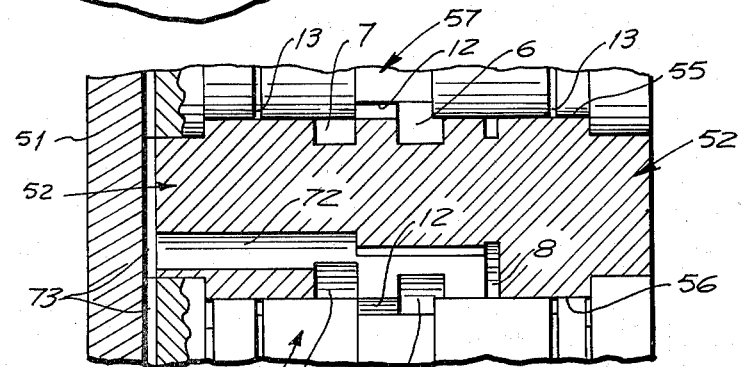
FIG. 11 is a fragmentary sectional view taken through 11—11 of FIG. 10.

Increased flow in either inlet passage 60 or 61 deflects the preponderance of the fluid toward the opposite pressure sensing chamber as shown in FIGS. 14 and 15.

Stated otherwise, the control means, is a fluidic signal amplifier which employs trapped signal pressures on opposite sides of a flat central jet issuing from the inlet 63, in addition to the jet impact of the fluid signals issuing through inlets 60 and 61, to deflect the flat jet. A downstream bypass 66 prevents back pressure deflection of the flat jet from downstream back pressure.

Figure 2:
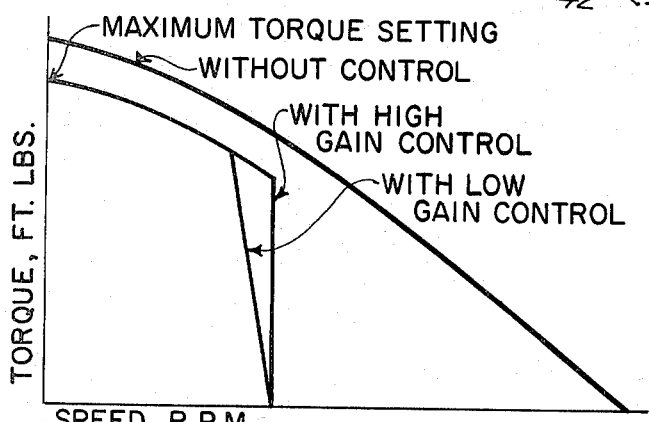
FIGS. 2, 3, and 4 are graphs for illustrating various modes of operation of the pressure-flow regulator.
Figure 3:
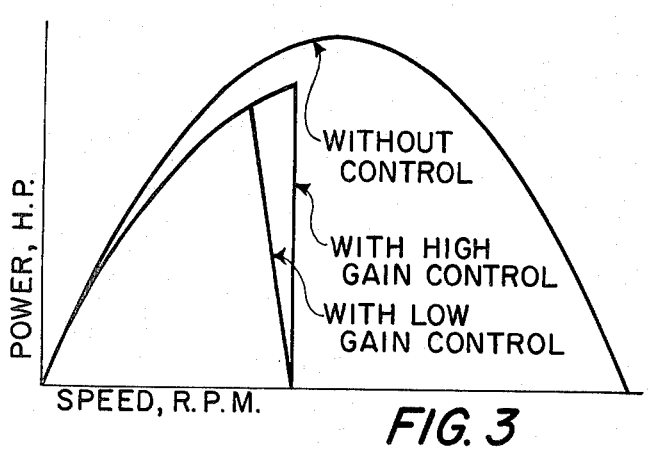
Figure 4:
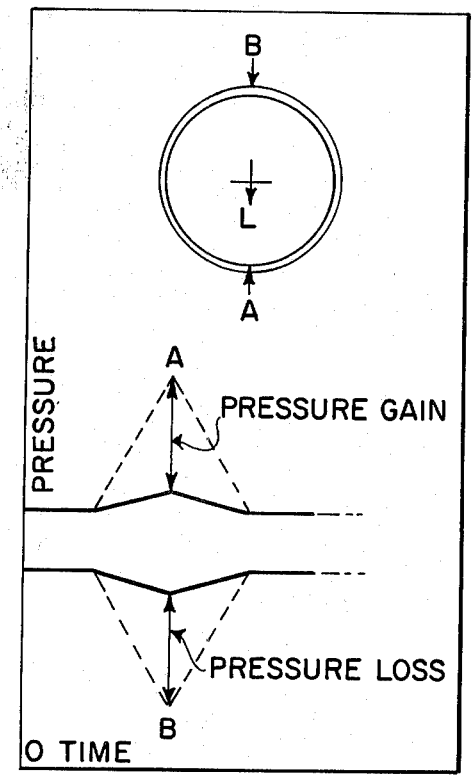
Figure 10:
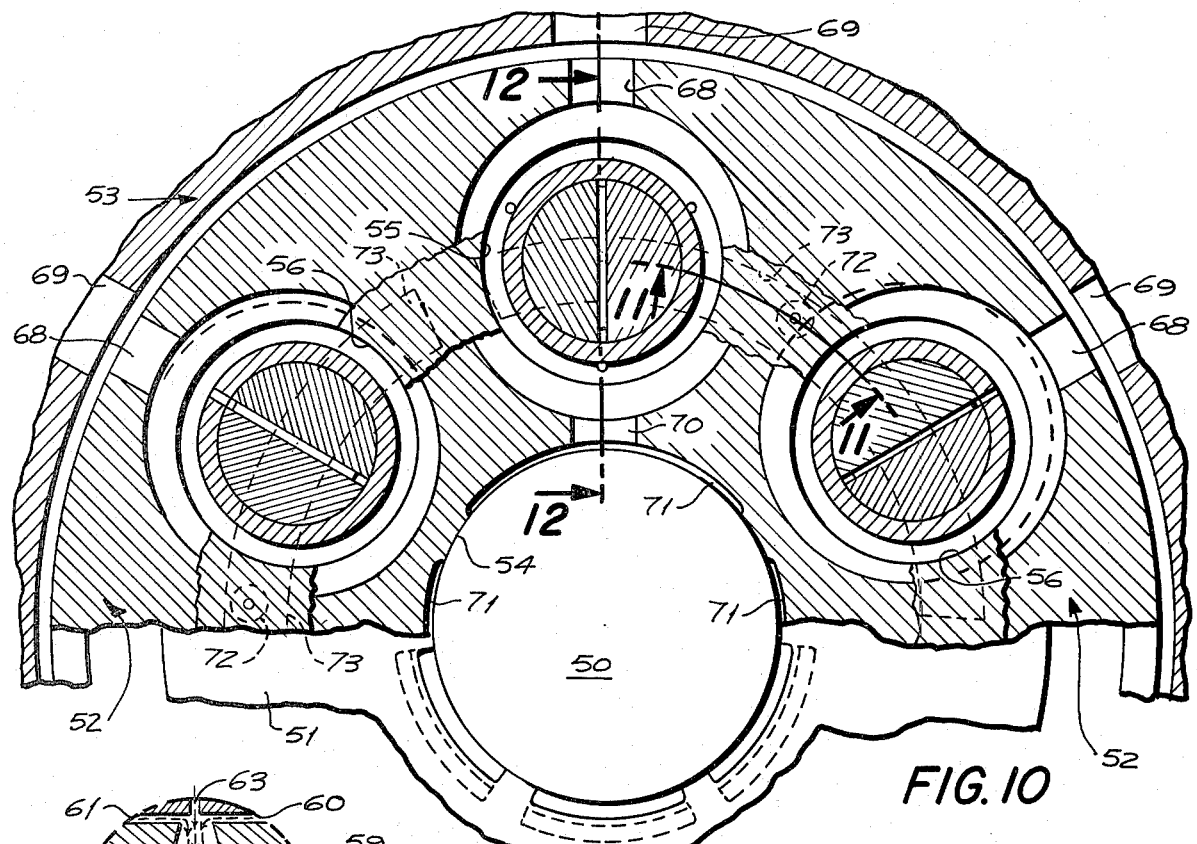
FIG. 10 is a fragmentary sectional view of a bearing structure incorporating another embodiment of the pressure-flow regulator, the view being taken through 10—10 of FIG. 12.
Figure 12:
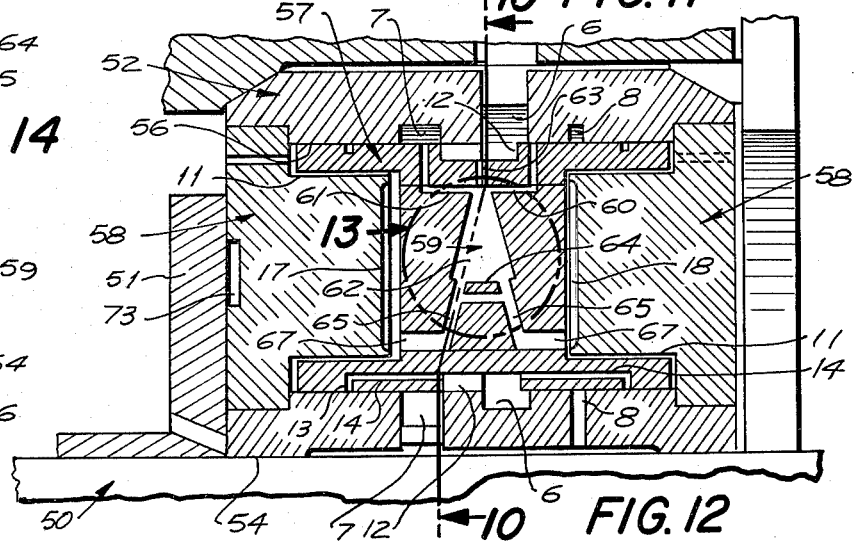
FIG. 12 is a fragmentary sectional view taken through 12—12 of FIG. 10.

While the pressure flow regulator has been shown used as a pilot valve, and fluid (gas or liquid) bearing, it is adapted for many other uses. For example the regulator may be used as an inlet flow control to regulate the speed and torque of a fluid motor. Referring to FIG. 2, the graph here illustrated indicates that the regulator may be set by positioning the end plugs 15 or by use of the adjusting means shown in FIGS. 7, 8 or 9, the fluid motor may be operated at a selected speed and torque. Referring to FIG. 3, the graph here illustrated, indicates that the regulator may be similarly adjusted to regulate the power output. The indication, "Low Gain Control" indicates the lower gain and the slower response attained with the piston arrangement represented in FIG. 5, whereas "High Gain Control" indicated the higher gain and the faster response when the fluidic control shown in FIG. 12 is used.

Having fully described my invention it is to be understood that I am not to be limited to the details herein set forth, but that my invention is of the full scope of the appended claims.

I claim:

1. A pressure flow regulator, comprising:
   a. a housing having a piston receiving bore, the bore having an inlet channel and an outlet channel axially spaced therefrom;
   b. closures for the ends of the bore;
   c. and a piston received in the bore for limited axial movement between the closures and forming therewith an inlet pressure sensing chamber and an outlet pressure sensing chamber;
   d. the piston including a connecting channel bridging between the inlet channel and outlet channel and forming with the outlet channel a first variable orifice; an inlet control passageway communicating between the inlet channel and inlet pressure sensing chamber and forming with the inlet channel a second variable orifice; and an outlet control passageway communicating between the outlet channel and the outlet pressure sensing chamber;
   e. the outlet pressure sensing chamber being responsive to increase outlet pressure to move the piston in a direction to increase the first variable orifice and to supply more fluid to the outlet channel and simultaneously to increase the second variable orifice thereby to produce an increased opposing pressure in the inlet pressure sensing chamber; the outlet pressure sensing chamber also being responsive to decreased outlet pressure to reduce the first and second orifices.

2. A pressure flow regulator as defined in claim 1, wherein:

a. a bleed port for at least one of the pressure sensing chambers to permit establishment of an equilibrium condition wherein inward flow offered to a pressure sensing chamber equals outward flow therefrom.

3. A pressure flow regulator, as defined in claim 1, wherein;
   a. a bleed port is formed between one of the closures and a bleed channel formed in the housing and the closure is axially adjustable to vary the bleed port area, thereby to vary the effect of pressure change at the corresponding housing channel.

4. A pressure flow regulator, as defined in claim 3, wherein;
   a. remote control means effects adjustment of the bleed port.

5. A pressure flow regulator, as defined in claim 3, wherein;
   a. the bleed port is provided for the inlet pressure sensing chamber.

6. A pressure flow regulator, as defined in claim 3, wherein;
   a. an adjustable bleed port is provided for each pressure sensing chamber.

7. A pressure flow regulator, as defined in claim 1, wherein a fluidic amplifier is interposed in the inlet and outlet control passageways, the fluidic amplifier including:
   a. a common chamber having entrance ports arranged to effect mutual impingement of fluid entering the chamber from the inlet ends of the passageways and a pair of exit ports, communicating with the discharge ends of the passageways;
   b. and a jet orifice for directing an amplifying fluid jet transverse to the mutually impinging fluid thereby to deflect the impinging fluid toward the exit ports in proportion to the rates of flow of fluid entering the inlet ends of the passageways.

8. A pressure flow regulator, comprising:
   a. a housing having a piston receiving bore, the bore having an inlet channel for communication with a source of pressure fluid, and an outlet channel for communication with a fluid operated means, the channels being adjacent but axially spaced;
   b. closures for the ends of the bore;
   c. a piston received in the bore for limited axial movement between the closures and forming therewith an inlet pressure sensing chamber and an outlet pressure sensing chamber;
   d. the piston including a connecting channel bridging between the inlet and outlet channels and forming with the outlet channel a variable main orifice;
   e. the piston also including a first passage means communicating between the inlet channel and the inlet pressure sensing chamber, forming at the inlet channel a variable control orifice, and a second passage means communicating between the outlet channel and the outlet pressure sensing chamber;
   f. said piston being movable in response to change in pressure in the outlet pressure sensing chamber to cause proportional opening or closing of said main orifice; the control orifice being operable to equalize pressures between the inlet pressure sensing chamber and outlet pressure sensing chamber and maintain the piston in its changed position subject to subsequent change of pressure in the outlet channel.

9. A pressure flow regulator as defined in claim 8, wherein:
   a. the first and second passage means are interconnected by a fluidic amplifier.

10. A pressure flow regulator for pilot control of a valve structure in a main flow line, the valve structure having a valve cylinder and main piston forming a control chamber, the piston being movable with increased pressure in the control chamber to close the flow line, the control chamber having a bleed port communicating downstream therefrom, and connected by a pilot outlet from the regulator, and a pilot inlet line to the regulator, said pressure flow regulator comprising:
   a. a housing having a piston receiving bore, the bore having an inlet channel for communication with said pilot inlet line, and an outlet channel for communication with said pilot outlet line;
   b. closures for the ends of the bore;
   c. a control piston received in the bore for limited axial movement between the closures and forming therewith an inlet pressure sensing chamber and an outlet pressure sensing chamber;
   d. the piston including a connecting channel bridging between the inlet and outlet channels and forming with the inlet channel a variable main orifice;
   e. the piston also includes a first passage means, communicating between the inlet channel and the inlet pressure sensing chamber, forming at the inlet channel, a variable control orifice; and second passage means communicating between the outlet channel and the outlet pressure sensing chamber, said first passage means being operable to cause proportional opening of closing of said main orifice to effect a change in position of the control piston and main piston, the control orifice being operable to equalize pressure between the inlet pressure sensing chamber and outlet pressure sensing chamber subject to change in pressure at the outlet channel and pilot outlet line.

11. A pressure flow regulator as defined in claim 10, wherein:
   a. the first and second passages are interconnected by a fluidic chamber having a pair of opposed inlet ports for mutual impingement of fluid received from the inlet and outlet channels, a jet fluid port perpendicular to the inlet ports to deflect fluid reveived in the chamber and a pair of outlet ports communicating with the pressure sensing chambers, the outlet ports positioned to receive fluid in proportion to the flow through the inlet ports amplified by the fluid from the jet port.

12. A fluid bearing, comprising:
   a. a housing structure having a bearing bore adapted to receive a shaft and including a set of circumferentially distributed radially directed pressure fluid chambers confronting the shaft, a set of pressure flow regulator piston bores surrounding the shaft, each piston bore having an inlet channel communicating with a source of pressure fluid and an outlet channel axially spaced from the inlet channel and communicating with a corresponding pressure fluid chamber;
   b. closures for the ends of each piston bore;
   c. a piston received in each bore for limited axial movement between the closures and forming therewith an inlet pressure sensing chamber and an outlet pressure sensing chamber;
   d. the piston including a connecting channel bridging between the inlet and outlet channels and forming with the outlet channel a variable main orifice;

e. the piston also including a first passage means communicating between the inlet channel and the inlet pressure sensing chamber, forming at the inlet channel a variable control orifice, and a second passage means communicating between the outlet channel and the outlet pressure sensing chamber to sense pressure at a corresponding pressure fluid chamber;

f. said piston being movable in response to change in pressure in its corresponding outlet pressure sensing chamber and pressure fluid chamber to cause proportional opening or closing of said main orifice, the control orifice being operable to equalize pressures between the inlet pressure sensing chamber and outlet pressure sensing chamber and maintain the piston in its changed position subject to change of pressure in the outlet channel and corresponding pressure fluid chamber.

13. A fluid bearing, as defined in claim 12, wherein:

a. the shaft is provided with a thrust bearing plate;

b. the housing structure includes a set of circumferentially distributed axially directed pressure fluid chambers confronting the thrust bearing plate, a second set of pressure flow regulator piston bores disposed between the first set thereof, each piston bore having an inlet channel communicating with a source of pressure fluid and an outlet channel axially spaced from the inlet channel and communicating with a corresponding axially directed pressure fluid chamber;

c. closures for the ends of each piston bore;

d. a piston received in each bore for limited axial movement between the closures and forming therewith an inlet pressure sensing chamber and an outlet pressure sensing chamber;

e. the piston including a connecting channel bridging between the inlet and outlet channels and forming with the outlet channel a varible main orifice;

f. said piston being movable in response to change in pressure in its corresponding outlet pressure sensing chamber and axially directed pressure fluid chamber to cause proportional opening and closing of said main orifice, the control orifice being operable to equalize pressures between the inlet pressure sensing chamber and outlet pressure sensing chamber and maintain the piston in its changed position subject to change in pressure in the outlet channel and corresponding axially directed pressure fluid chamber.

14. A pressure flow regulator, comprising:

a. a housing structure having a piston receiving cavity closed at its ends and including an inlet and an outlet;

b. and a piston received in the bore for limited axial movement between the ends of the bore and forming therewith an inlet pressure sensing chamber and an outlet pressure sensing chamber;

c. the piston forming between the inlet and outlet a variable main orifice and forming with the inlet a variable control orifice; first control passageway communicating between the outlet and the outlet pressure sensing chamber; and a second control passageway communicating between the variable control orifice and inlet pressure sensing chamber;

d. the piston being movable in response to change in pressure at the outlet as sensed in the outlet pressure sensing chamber to cause corresponding opening or closing of said main orifice;

e. the control orifice being operable to equalize pressures between the inlet and outlet pressure sensing chambers to maintain the piston in its changed position subject to subsequent change of pressure at the outlet.

15. A pressure flow regulator, as defined in claim 13, wherein:

a. the first and second passageways are intercepted by a fluidic amplifier.

16. A pressure flow regulator as defined in claim 13, wherein:

a. at least one of the pressure sensing chambers is provided with a variable bleed outlet thereby to vary the effect of pressure change at the opposite end of the control passageway connected therewith.

17. A pressure flow regulator as defined in claim 13, wherein:

a. a plurality of pressure flow regulators are disposed in a ring about a shaft and the outlets communicate with a set of circumferentially spaced bearing pressure chambers confronting the shaft.

18. A pressure flow regulator as defined in claim 13, wherein:

a. a plurality of pressure flow regulators are disposed in a ring in axially displaced relation to a thrust plate and communicate with a set of circumferencially spaced bearing pressure chambers in axial confrontation to the thrust plate.

* * * * *